United States Patent
Tsuruyama

(10) Patent No.: US 9,779,339 B2
(45) Date of Patent: Oct. 3, 2017

(54) PRINTER, TERMINAL DEVICE, AND PRINTING SYSTEM

(71) Applicant: SEIKO EPSON CORPORATION, Tokyo (JP)

(72) Inventor: Shinichi Tsuruyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/171,412

(22) Filed: Jun. 2, 2016

(65) Prior Publication Data

US 2016/0358053 A1 Dec. 8, 2016

(30) Foreign Application Priority Data

Jun. 5, 2015 (JP) ................... 2015-114533

(51) Int. Cl.
*G06F 3/12* (2006.01)
*G06K 15/00* (2006.01)
*H04N 1/32* (2006.01)

(52) U.S. Cl.
CPC ....... *G06K 15/402* (2013.01); *G06K 15/4015* (2013.01); *H04N 1/32309* (2013.01)

(58) Field of Classification Search
CPC ............ G06K 15/402; G06K 15/4015; H04N 1/32309

USPC ........................................ 358/1.15
See application file for complete search history.

(56) References Cited

U.S. PATENT DOCUMENTS

| 8,810,600 | B2 * | 8/2014 | Bohn | H04N 13/0425 345/619 |
|---|---|---|---|---|
| 2013/0141747 | A1 * | 6/2013 | Oba | G06F 3/1292 358/1.14 |
| 2014/0240708 | A1 * | 8/2014 | Matsushita | G01J 3/26 356/402 |
| 2014/0327603 | A1 | 11/2014 | Hiraide | |
| 2016/0037017 | A1 * | 2/2016 | Morovic | H04N 1/32309 358/3.28 |

FOREIGN PATENT DOCUMENTS

| JP | 2006-163731 A | 6/2006 |
| JP | 2008-079225 A | 4/2008 |
| JP | 2014-219468 A | 11/2014 |

\* cited by examiner

*Primary Examiner* — Marivelisse Santiago Cordero
*Assistant Examiner* — Neil R McLean
(74) *Attorney, Agent, or Firm* — Foley & Lardner LLP

(57) ABSTRACT

A printer including a printing execution unit configured to execute printing; a code conversion unit configured to encode operational information in relation to the printing execution unit to generate an image pattern; and a display unit configured to display the image pattern, generated by the code conversion unit, on the display unit itself.

5 Claims, 7 Drawing Sheets

PRINTER, TERMINAL DEVICE, AND PRINTING SYSTEM

BACKGROUND

1. Technical Field

The present invention relates to a technology for notifying operational information in relation to a printer to a service person.

2. Related Art

In JP-A-2006-163731, there is disclosed a technology for supporting work by a service person through the use of a terminal device, such as a head mounted display (HMD).

Meanwhile, it has been considered to make use of such a technology using a terminal device in maintenance of a printer. In this case, however, in order to appropriately perform the maintenance of a printer, a service person is required to grasp operational information in relation to the printer. Thus, a technology that enables such a service person to, through the use of a terminal device, easily acquire the operational information in relation to the printer has been required.

SUMMARY

An advantage of some aspects of the invention is that a technology is provided that enables a service person to, through the use of a terminal device, easily acquire operational information in relation to a printer.

A printer according to a first aspect of the invention and constituting the foregoing technology includes a printing execution unit configured to execute printing; a code conversion unit configured to encode operational information in relation to the printing execution unit to generate an image pattern; and a display unit configured to display the image pattern, generated by the code conversion unit, on the display unit itself.

In such a printer configured in this manner, the image pattern, resulting from the encoding of the operational information, is displayed on the display unit. This configuration, therefore, enables a service person to, through the use of a terminal device configured to read and decode the image pattern, easily acquire the operational information in relation to the printer.

Further, the above printer may be configured such that the code conversion unit encodes the operational information into an image pattern representing a plurality of pieces of information by at least one color difference. Such an image pattern including the at least one color difference represents the operational information at a higher record density (this record density being equivalent to an information amount per unit area), as compared with an image pattern including no color difference (i.e., an image pattern colored in a single color).

Further, the above printer may be configured such that the display unit displays a color patch for use in calibration of a terminal device configured to perform colorimetry on the image pattern. This configuration allows the device terminal to perform the colorimetry on the image pattern after having performed the calibration using the color patch, and thus improves the accuracy of reading of the image pattern by the terminal device.

By the way, when the at least one color difference, included in the image pattern to allow the plurality of pieces of information to be discriminated, is very small, the terminal device may fail to read the image pattern. The above printer, therefore, may be configured such that the code conversion unit adjusts the degree of the at least one color difference, included in the image pattern to allow the plurality of pieces of information to be discriminated. This configuration eliminates or minimizes the failure in the reading of the image pattern.

In this case, the above printer may further include an input operation unit configured to receive an input operation, and may be configured such that, in accordance with the input operation, received by the input operation unit, the code conversion unit adjusts a degree of the at least one color difference, included in the image pattern to allow the plurality of pieces of information to be discriminated. This configuration eliminates or minimizes the failure in the reading of the image pattern by allowing a service person to perform the input operation.

Further, the above printer may be configured such that the code conversion unit encodes the operational information into a plurality of segmented image patterns resulting from segmenting the image pattern, and the display unit sequentially displays the plurality of segmented image patterns in time series on the display unit itself. This configuration reduces the area of a region required to display the image pattern.

A terminal device according to a second aspect of the invention and constituting the foregoing technology includes a read unit configured to read an image pattern resulting from encoding operational information in relation to a printer that performs printing; and a decode unit configured to decode the image pattern, obtained through the reading by the read unit.

The use of such a terminal device configured in this manner enables a service person to easily acquire the operational information in relation to the printer.

A printing system according to a third aspect of the invention and constituting the foregoing technology includes a printer and a terminal device. The printer includes a printing execution unit configured to execute printing; a code conversion unit configured to encode operational information in relation to the printing execution unit to generate an image pattern; and a display unit configured to display the image pattern, generated by the code conversion unit, on the display unit itself. The terminal device includes a read unit configured to read the image pattern; and a decode unit configured to decode the image pattern, obtained through the reading by the read unit.

Such a printing system configured in this manner allows the image pattern, resulting from the encoding of the operational information, to be displayed on the display unit, and allows a service person to acquire the operational information through the use of the terminal device, which reads and decodes the image pattern. The printing system, therefore, enables the service person to easily acquire the operational information in relation to the printer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
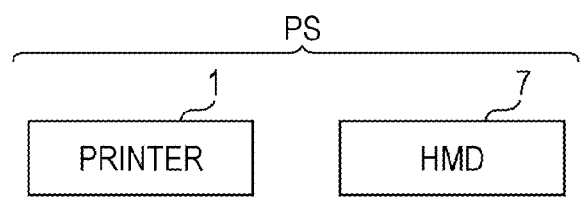
FIG. 1 is a schematic block diagram illustrating a printing system according to an embodiment of the invention.

FIG. 1 is a schematic block diagram illustrating a printing system PS, a printing system according to an embodiment of the invention. The printing system PS includes a printer 1 and an HMD 7. The printer 1 is a target of work by a service person. The HMD 7 displays operational information in relation to the printer 1 such that the displayed operational information is directed toward the service person. Such a printing system PS is configured to support a service person who performs work on the printer so that the service person is able to perform appropriate work on the printer 1. That is, the printing system PS allows the service person to grasp operational information, such as a paper jam or the lack of an ink, in relation to the printer 1 through the use of the HMD 7 so as to enable the service person to perform appropriate work, such as the elimination of a paper jam or the filling up of an ink, on the printer 1.

Figure 2:
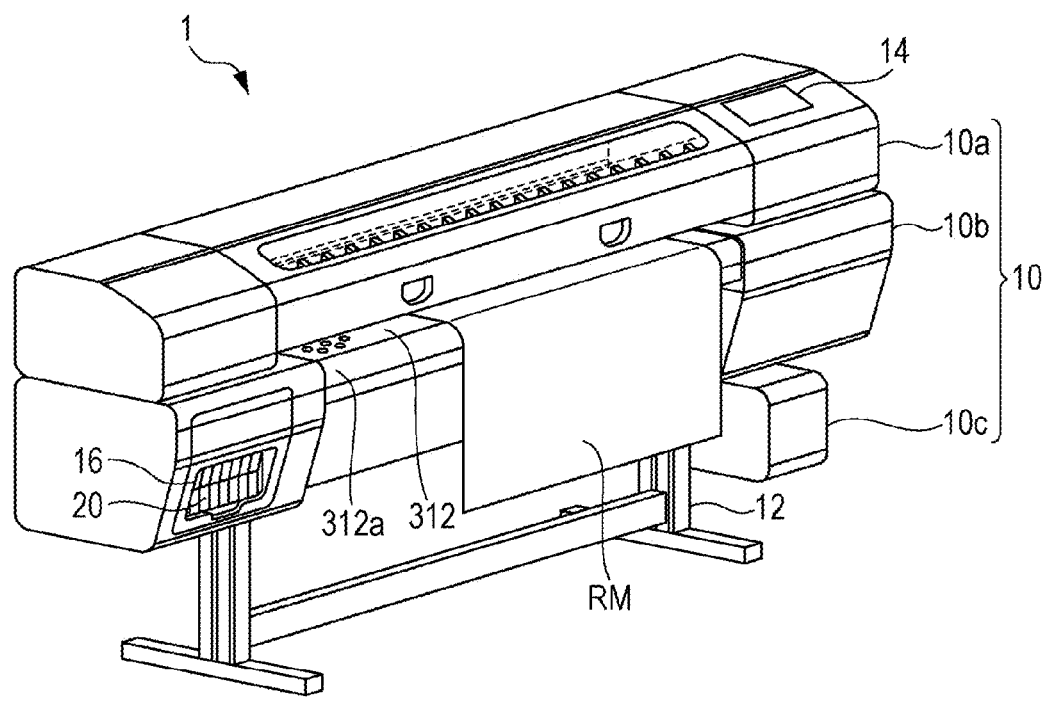
FIG. 2 is a perspective view of a printer according to an embodiment of the invention illustrating an example of the external appearance of the printer.
Figure 3:
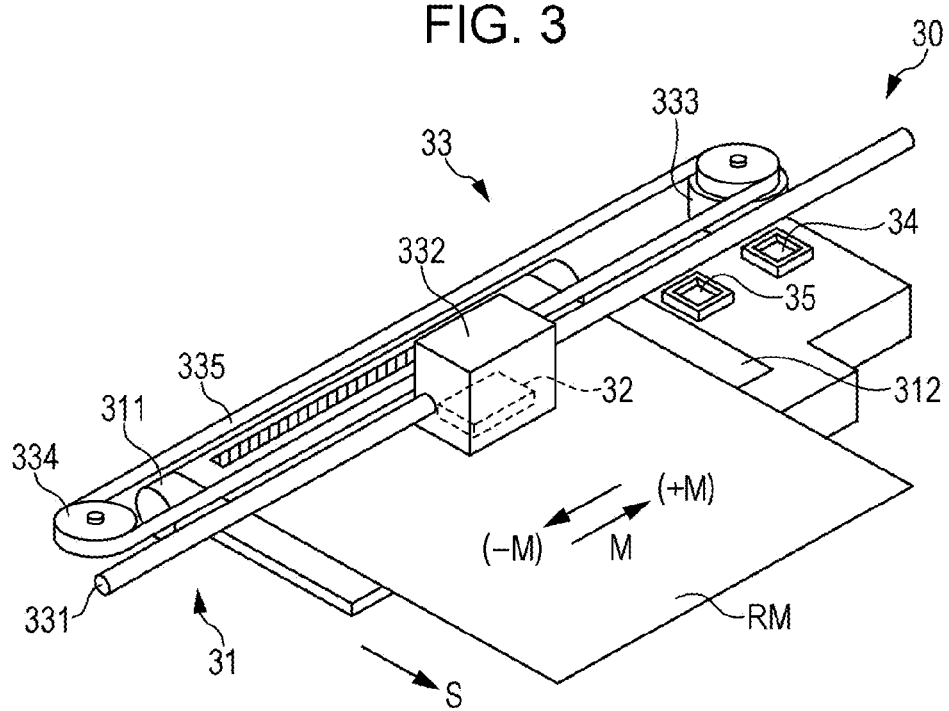
FIG. 3 is a schematic perspective view of an engine portion incorporated in a printer according to an embodiment of the invention.

FIG. 2 is a perspective view of the printer 1, according to this embodiment, illustrating an example of the external appearance of the printer 1. FIG. 3 is a schematic perspective view of an engine portion 30, an engine portion incorporated in the printer 1. The printer 1 discharges liquid droplets of ink compositions onto a recording medium RM on the basis of printing data so as to print characters and/or images corresponding to the printing data on the recording medium RM. Hereinafter, the ink compositions will be referred to as just "inks", and the liquid droplets will be referred to as "ink droplets". Examples of recording media usable as the recording medium RM include, but are not limited to, not only paper, such as a single sheet of paper of large size such as A1 size in JIS standard, or roll paper having the same width as that of the single sheet of paper, but also a resin film and any other similar material.

As illustrated in FIG. 2, the printer 1 includes a body portion 10 and a leg portion 12 for supporting the body portion 10. The body portion 10 is constituted by three kinds of box members, that is, an upper box member 10a, a lower box member 10b, and a small box member 10c. The upper box member 10a and the lower box member 10b are vertically stacked each other. Further, an operation panel 14 is disposed at the right front side of the upper box member 10a. This operation panel 14 includes, for example, a touch panel display, and performs the function of displaying various messages and any other pieces of information, and the function of receiving input operations by a service person. Further, a cartridge holder 16 is mounted at the left front side of the lower box member 10b.

This cartridge holder 16 holds ink cartridges 20 each containing an ink.

Although omitted from illustration in FIG. 2, in a rear portion of the lower box member 10b (the rear portion being located at the back side of FIG. 2), a spindle is horizontally disposed and a roll is attached to the spindle. Further, the recording medium RM, which has a long length before subjected to printing, is wound around the roll. The upper box member 10a and the lower box member 10b are configured to allow the recording medium RM to be drawn from the roll through a space between the upper box member 10a and the lower box member 10b themselves. Further, a transport portion 31 of the engine portion 30 transports the recording medium RM in a forward direction toward the front side of the body portion 10 (this front side being located at the near side of each of FIGS. 2 and 3), and in conjunction with this forward transport of the recording medium RM, an head unit 32 of the engine portion 30 executes printing onto the recording medium RM. The recording medium RM, having been subjected to the printing in this manner, is further transported by the transport portion 31 in the forward direction toward the front side of the body portion 10, and bends down because of its self-weight.

Next, the engine portion 30 will be described referring to FIG. 3. The engine portion 30 includes, in addition to the transport portion 31 and the head unit 32, which have been described above, a scanning portion 33, for moving the head unit 32; a cap portion 34; a flushing portion 35; and any other component.

The transport portion 31 includes a transport motor (omitted from illustration); a transport drive roller 311; a transport driven roller (omitted from illustration); a suction platen 312; and any other component. The transport drive roller 311 and the suction platen 312 are disposed in this order in a transport direction S, in which the recording medium RM is transported. The transport drive roller 311 is contained inside the upper box portion 10a; while the suction platen 312 is contained inside the lower box portion 10b. Further, when the transport motor is under operation, the rotation of the transport motor drives the transport drive roller 311 to rotate while pressing the recording medium RM, so that the transport drive roller 311 transports the recording medium RM forward onto the suction platen 312, located anterior to the transport drive roller 311.

The suction platen 312 has a horizontal and flat surface, and supports the recording medium RM, having been transported to the suction platen 312 itself by the transport drive roller 311, from below. The suction platen 312 includes a large number of suction holes communicating with a pressure reduction source, such as a suction fan, on the surface of the suction platen 312 itself to suction the recording medium RM. This configuration allows the suction platen 312 to, at a position below the head unit 32, retain the recording medium RM, with its curing tendency flatly corrected. Further, the suction platen 312 includes a smooth guide face 312a at the front edge of the suction platen 312 itself to smoothly and downwardly guide the recording medium RM, transported forward by the transport drive roller 311.

The head unit 32 includes a plurality of nozzles, and intermittently discharges ink droplets through the individual nozzles while being moved in a movement direction M (see FIG. 3) by the scanning portion 33. This intermittent discharge of ink droplets allows dot lines (raster lines) arranged along the movement direction M to be formed on the surface of the recording medium RM. As shown in FIG. 3, the scanning portion 33 includes a guide rail 331; a carriage 332; a carriage motor 333; and any other component. The guide rail 331 is disposed inside the upper box member 10a to horizontally extend in a long-side direction of the upper box member 10a. The carriage 332 includes the head unit 32, and is disposed to, in a state of being supported by the guide rail 331, horizontally reciprocate (scan) along the guide rail 331, in the movement direction M.

A timing belt 335 is disposed at the rear side of the guide rail 331 in a state of being hung between a pair of pulleys 334. One of the pulleys 334 is coupled with the rotation shaft (omitted from illustration) of the carriage motor 333. The timing belt 335 is configured to be movable parallel to the guide rail 331 within a region between the pair of pulleys 334. Further, part of the timing belt 335 is coupled with the carriage 332. Thus, when the carriage motor 333 is under operation, the carriage 332 is moved in the movement direction M in conjunction with the rotation of the carriage motor 333.

The carriage 332 is configured to be movable across the recording medium RM in the movement direction M. Further, in a region located outer than the suction platen 312 in the movement direction M, the flushing portion 35 and the cap portion 34 are disposed in series. The flushing portion 35 and the cap portion 34 operate as maintenance units. Further, when the carriage motor 333 is under operation, in conjunction with the rotation of the carriage motor 333, the head unit 32 is movable to each of the position of the flushing portion 35 and the position of the cap portion 34. For example, the carriage 332 (the head unit 32) is caused to move to the position of the flushing potion 35, and to discharge inks through predetermined ones of the nozzles so as to be subjected to a flushing process. Meanwhile, the flushing portion 35 absorbs the discharged inks. Such a flushing process removes the inks, with their viscosities increased, from the head unit 32. Further, the cap portion 34 air-tightly seals the lower face of the head unit 32 during a halt of the operation of the printer 1 to eliminate or minimize the viscosity increase or hardening of inks in the head unit 32.

Figure 4:
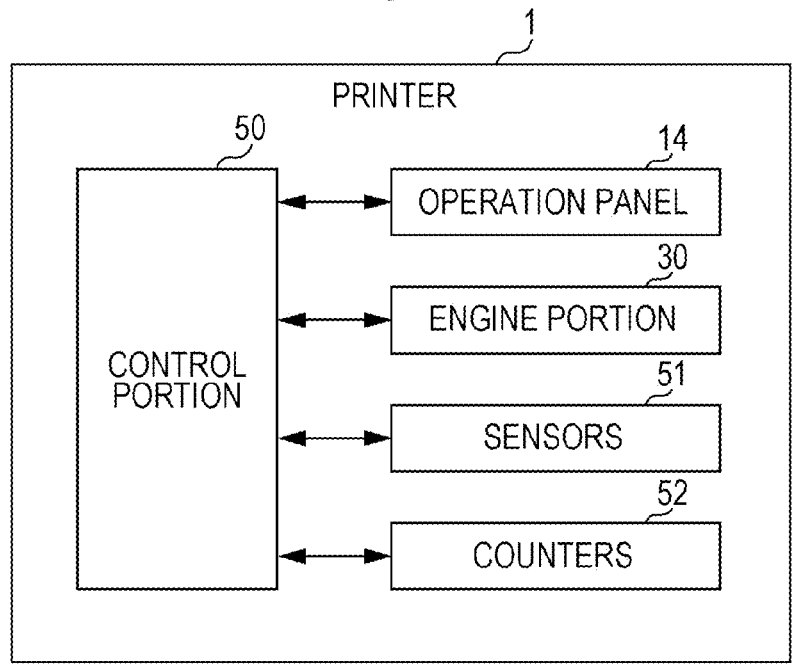
FIG. 4 is a block diagram illustrating an example of the electric configuration of a printer according to an embodiment of the invention.

FIG. 4 is a block diagram illustrating an example of the electric configuration of the printer 1. As shown in FIG. 4, the printer 1 includes a control portion 50. This control portion 50 performs an overall control of the whole of the printer 1. The control portion 50 is a computer including a central processing unit (CPU) and a random access memory (RAM). Moreover, the printer 1 includes a plurality of sensors 51 and a plurality of counters 52. The control portion 50 controls the display of the operation panel 14 and the operation of the engine portion 30 on the basis of the outputs of the sensors 51 and the counters 52.

The sensors 51 detect the states of the engine portion 30; while the counters 52 count various numerical values that vary with the operation of the engine portion 30. Examples of the states of the engine portion 30 include, but are not limited to, the transport state of the printing medium RM, the open or closed state of a body cover, and the attachment states of various parts. The sensors 51 are provided with various types of sensors to detect these states. Further, examples of the numerical values, which vary with the operation of the engine portion 30, include, but are not limited to, an accumulated length of web having been subjected to printing, consumed amounts of inks (or remaining amounts of inks), accumulated rotation amounts of mechanical parts that rotate (for example, a roller for transporting the printing medium RM). The counters 52 are provided with various types of counters to count these numerical values.

Figure 5:
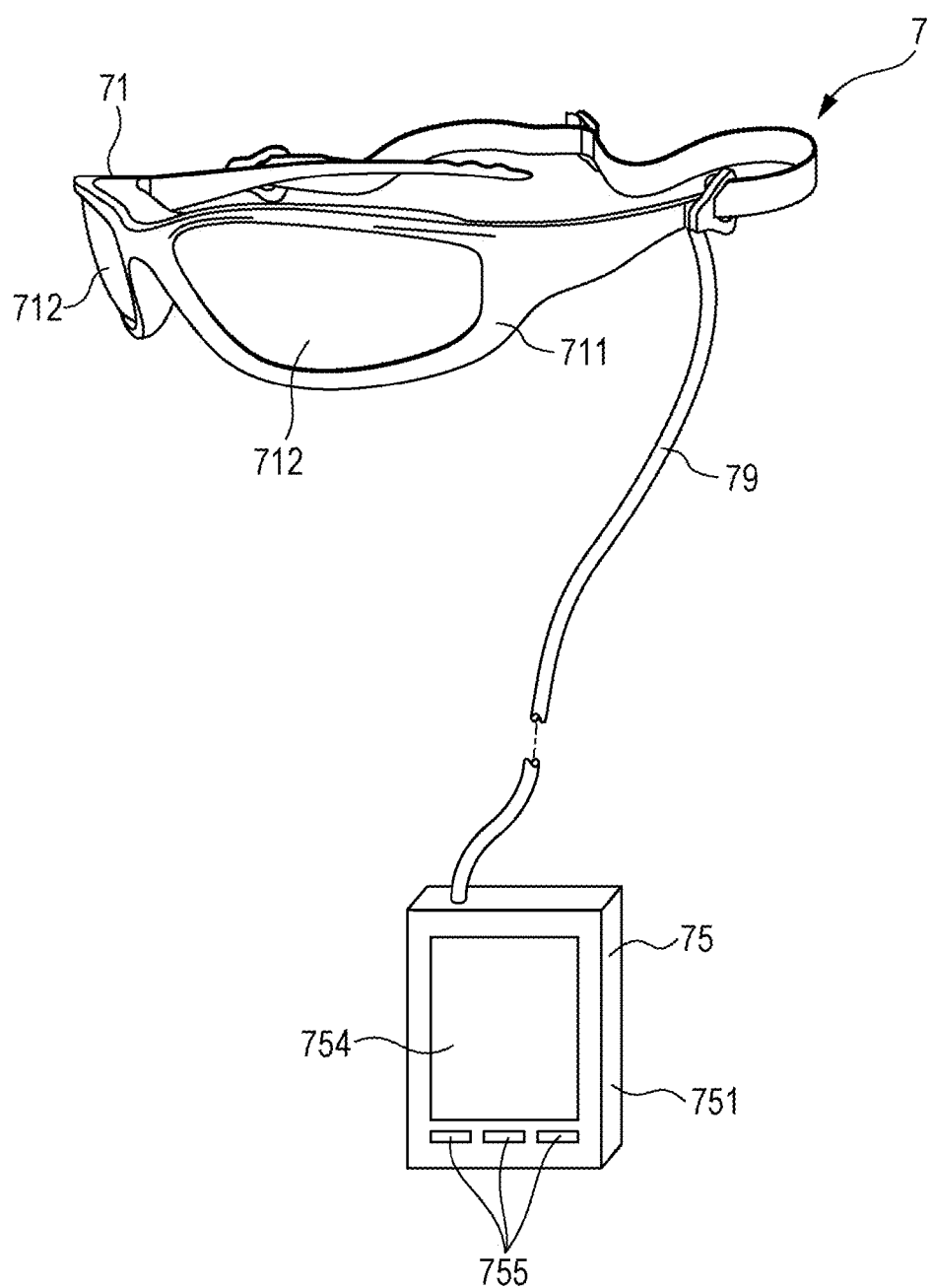
FIG. 5 is a schematic diagram illustrating an example of the mechanical structure of an HMD according to an embodiment of the invention.
Figure 6:
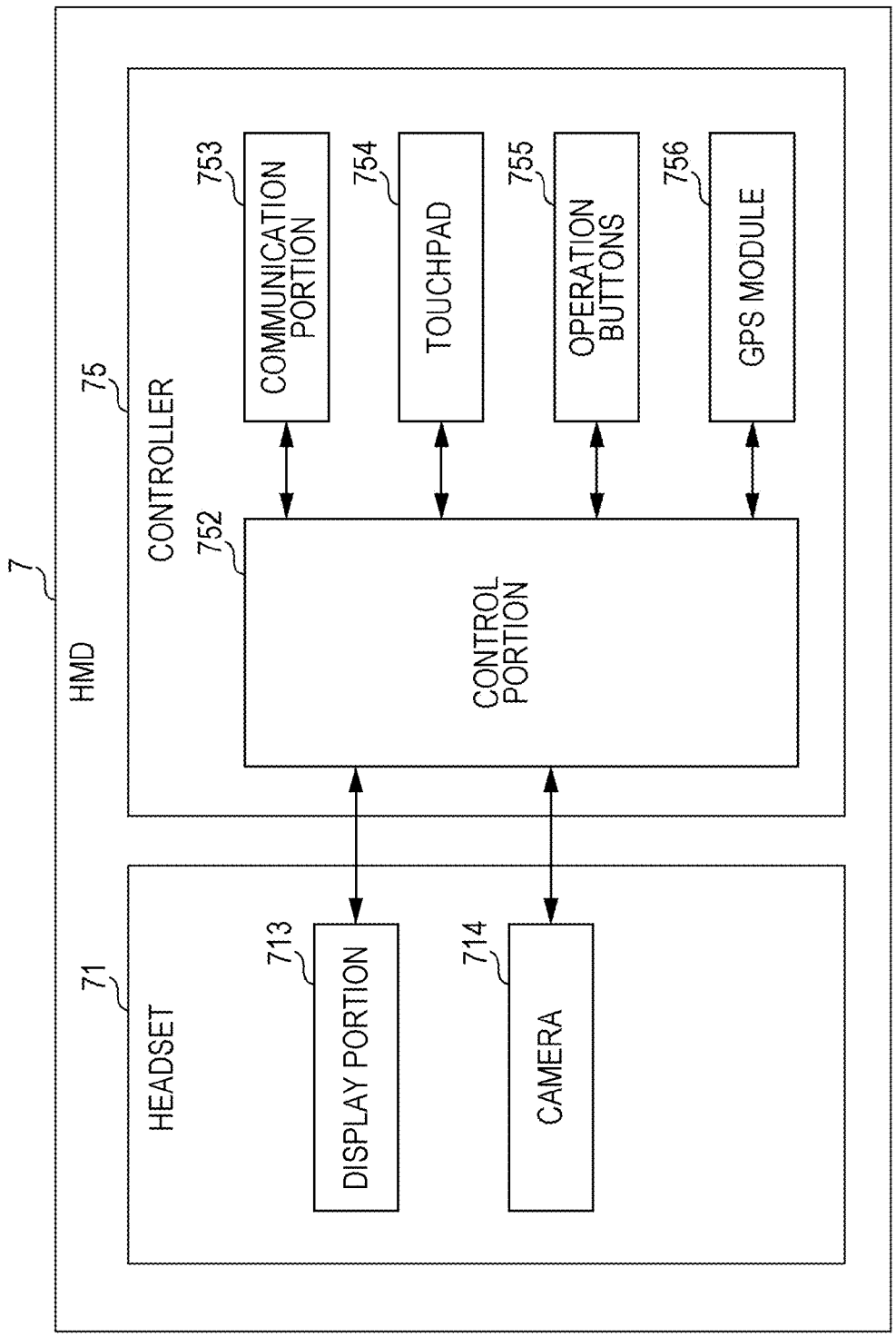
FIG. 6 is a block diagram illustrating an example of the electric configuration of an HMD illustrated in FIG. 5.

FIG. 5 is a schematic diagram illustrating an example of the mechanical structure of an HMD 7, an HMD according to an embodiment of the invention. FIG. 6 is a block diagram illustrating an electric configuration of the HMD 7, illustrated in FIG. 5. The HMD 7 includes a head set 71, a portable controller 75, and a cable 79. The head set 71 is weared by a service person. The cable 79 is used to interconnect the head set 71 and the controller 75. The HMD 7 is a light-transmission type HMD having the same configuration as that of a virtual image display device disclosed in, for example, JP-A-2014-219468 and JP-A-2014-225823.

The head set 71 includes a frame 711 (a body). The frame 711 is a spectacles-type frame wearable on the head of a service person. The frame 711 includes left-side and right-side lenses 712 attached to the frame 711 itself. The lenses 712 are each located in front of a corresponding one of left and right eyes of a service person wearing the frame 711, and transmit visual light rays. Thus, the service person, wearing the head set 71, is able to view surrounding states via the lenses 712. Further, the frame 711 includes a camera 714 attached thereto. The camera 714 images the surrounding states.

Moreover, the frame 711 includes a display portion 713. This display portion 713 displays images and/or characters so as to indicate the images and/or characters toward the service person. Thus, the service person, wearing the head set 71, is able to view display contents displayed by the display portion 713. In addition, the display portion 713 may be any one of two types of display: one being a type of display that allows a virtual image to be displayed; the other one being a type of display that allows images to be each focused on a corresponding one of the retinas of the service person.

The controller 75 includes a housing 751. This housing 751 is of a portable type that enables the service person to carry the controller 75 while putting it in his or her cloth's pocket or any other portion, or to hand-carry it. The housing 751 is provided therein with a control portion 752; a communication portion 753; a touchpad 754; operation buttons 755; and a global positioning system (GPS) module 756. The control portion 752 is a computer including a CPU and a RAM, and performs overall control of the HMD 7.

The communication portion 753 performs communication with an external management device via the Internet. The touchpad 754 and the operation buttons 755 each function as a user interface. That is, in response to an input operation through the touchpad 754 or the operation buttons 755 by a service person, the control portion 752 controls the display portion 713 in accordance with the input operation. In this manner, in response to an input operation by a service person, the control portion 752 performs display control to provide the service person with a display service, such as the change of a display position or the change of display contents. The GPS module 756 makes use of a satellite positioning system to detect the position of any one of the head set 71 and the controller 75, which are included in the HMD 7.

The printing system PS, having such a configuration as described above, allows the operation panel 14 of the printer 1 to display an image pattern resulting from encoding a piece of operational information, and allows the HMD 7 to read and decode the image pattern to indicate the piece of operational information to a service person. Subsequently, this operation will be described below in detail. In addition, the "image" of the image pattern is a concept not including any character, and thus, no character is included in the elements of an image pattern 8 described below.

Figure 7:
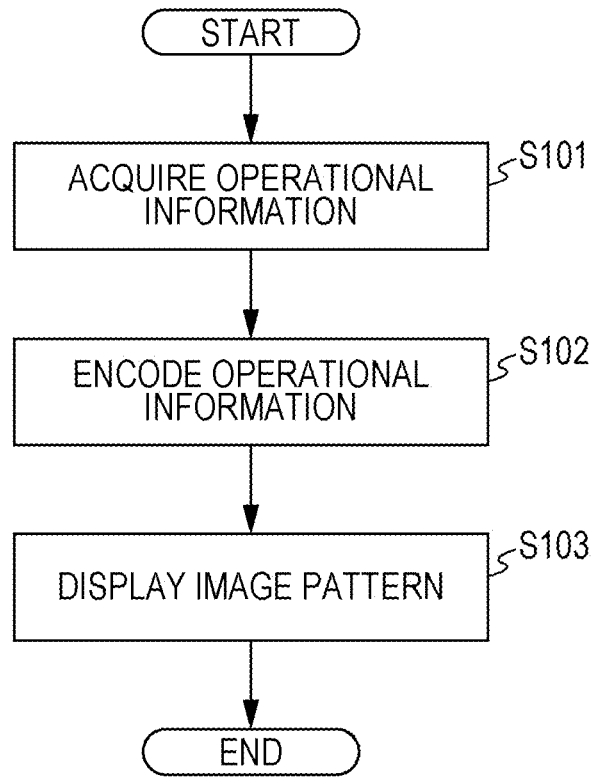
FIG. 7 is a flowchart illustrating an example of operation performed by a control portion of a printer according to an embodiment of the invention.

FIG. 7 is a flowchart illustrating an example of operation performed by the control portion 50 of the printer 1. In step S101, the control portion 50 analyzes the outputs of the sensors 51 and the output values of the counters 52 to acquire pieces of operational information each indicating a corresponding one of the operational states of the engine portion 30. Specific examples of the pieces of operational information include, but are not limited to, an accumulated number of sheets of printed paper and an accumulated amount of operational time in relation to the printer 1, in addition to pieces of information indicating trouble occurrences, such as the paper jam and the lack of an ink, which have been described above.

Figure 8:
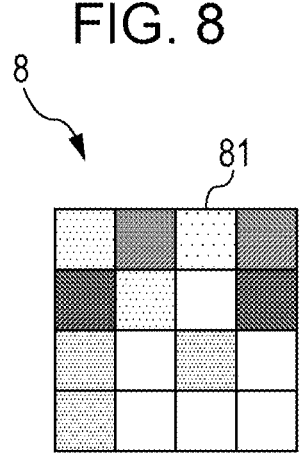
FIG. 8 is a schematic diagram illustrating an example of image patterns resulting from encoding operational information in relation to a printer according to an embodiment of the invention.

In step S102, the control portion 50 encodes the pieces of operational information in accordance with a preliminarily stored coding rule so as to convert each of the pieces of operational information into a corresponding one of two-dimensional image patterns (two-dimensional codes). FIG. 8 is a schematic diagram illustrating the image pattern 8, an example of the image patterns, each resulting from encoding a corresponding one of the pieces of operational information. As shown in FIG. 8, the image pattern 8 includes a configuration that allows a plurality of rectangular shaped cells 81 to be two-dimensionally arranged in a matrix shape. Each of the cells 81 is colored in a color among a plurality of mutually different colors (i.e., a plurality of colors each associated with a corresponding one of combinations of RGB levels, at least one of the RGB levels being represented by one of mutually different numerical values).

That is, as disclosed in, for example, JP-A-2008-079225, the plurality of mutually different colors, which are to be applied to the cells 81, are each associated with a corresponding one of mutually different characters. Accordingly, for example when a piece of operational information indicates a paper jam, each of a plurality of characters constituting a character string "PAPER JAM" is converted into a corresponding one of colors that is applied to a corresponding one of cells 81, and then, an image pattern 8 in which the relevant cells 81 are arranged in a matrix shape is generated.

Further, in step S103, the control portion 50 displays the image pattern 8 on the operation panel 14. There is a variety in the timing of execution of the operation shown in the flowchart of FIG. 7. The operation shown in the flowchart of FIG. 7 may be configured to be executed at, for example, predetermined time intervals, or every timing point when an error occurs in the engine portion 30.

Figure 9:
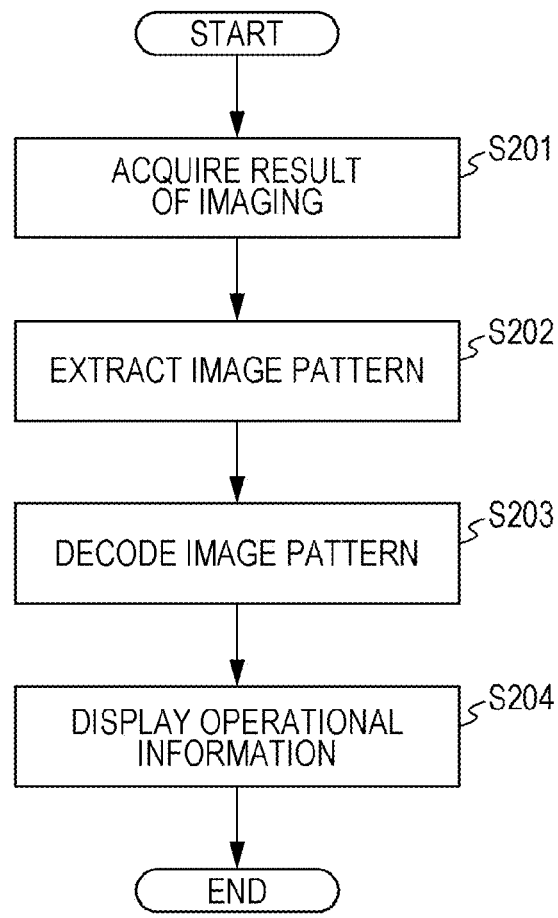
FIG. 9 is a flowchart illustrating an example of operation performed by a control portion of an HMD according to an embodiment of the invention.

FIG. 9 is a flowchart illustrating an example of operation performed by the control portion 752 of the HMD 7. As shown in FIG. 9, the control portion 752 acquires the result of imaging by the camera 714 (step S201) and extracts the image pattern 8 from the result of the imaging (step S202). Further, the control portion 752 decodes the image pattern 8, having been extracted in step S202, to acquire the character string, having been encoded into the image pattern 8 and representing the piece of operational information (step S203). The control portion 752 includes a decoding rule for operation reverse to the above operation, in which, in accordance with the coding rule, a character string representing a piece of operational information is converted into an image pattern 8. Thus, in accordance with the decoding rule, the control portion 752 decodes the image pattern 8 into the relevant character string. Further, the control portion 752 causes the display portion 713 to display the relevant character string, having been acquired in such a manner as described above and representing the relevant piece of operational information (step S204). Thus, the service person, wearing the HMD 7, is able to view the relevant piece of operational information, in relation to the engine portion 30 of the printer 1.

As described above, in the printer 1, an image pattern 8, resulting from encoding a piece of operational information in relation to the printer 1, is displayed on the operation panel 14. Thus, in cooperation with the HMD 7, which reads the image pattern 8 through an image resulting from imaging by the camera 714 incorporated in the HMD 7 and further decodes the image pattern 8, obtained through the reading, the printer 1 enables the service person to easily acquire the relevant piece of operational information in relation to the printer 1. For this reason, this configuration enables the printer 1 to send out any piece of operational information even though the printer 1 does not include any communication means that is directly or indirectly coupled with and communicates with an information terminal carried by a service person via a wired link, a wireless link, or any other communication link. Moreover, even when the printer 1 includes the communication means, the above configuration enables the printer 1 to send out any piece of operational information without using the communication means. The above configuration, therefore, is useful when the communication means is in a failure state or when the printer 1 is placed under an environment where there is no available communication link to be coupled with the communication means.

Further, the control portion 50 of the printer 1 encodes a piece of operational information into an image pattern 8 representing a plurality of pieces of information by at least one color difference. Such an image pattern 8 including the at least one color difference represents the piece of operational information at a higher record density (this record density being equivalent to an information amount per unit area), as compared with an image pattern including no color difference (i.e., an image pattern colored in a single color).

Further, the HMD 7 reads the image pattern 8, resulting from encoding the piece of operational information in relation to the printer 1, and decodes the relevant image pattern 8. Through the use of the HMD, which is configured in this manner and includes the camera 714, an imaging means, the service person is able to easily acquire the piece of operational information in relation to the printer 1.

That is, in the printing system PS, an image pattern 8 resulting from encoding a piece of operational information is displayed on the operation panel 14, and the image pattern 8 is read by the camera 714, incorporated in the HMD 7, and is further decoded by the HMD to allow the piece of operational information to be indicated to the service person. This configuration, therefore, enables the service person to easily acquire each of the pieces of operational information in relation to the printer 1.

The printing system PS in this embodiment corresponds to an example of a "printing system" in the invention; the printer 1 in this embodiment corresponds to an example of a "printer" in the invention; the engine portion 30 in this embodiment corresponds to an example of a "printing execution unit" in the invention; the control portion 50 in this embodiment corresponds to an example of a "code conversion unit" in the invention; the operation panel 14 in this embodiment corresponds to an example of a "display unit" in the invention; the HMD 7 in this embodiment corresponds to an example of a "terminal device" in the invention; the camera 714 in this embodiment corresponds to an example of a "read unit" in the invention; the control portion 752 in this embodiment corresponds to an example of a "decode unit" in the invention; and the image pattern 8 in this embodiment corresponds to an example of an "image pattern" in the invention.

It is to be noted herein that the invention is not limited to the aforementioned embodiment, and various modifications may be made on the aforementioned embodiment as far as the modifications do not depart from the gist of the invention. As exemplified below, therefore, various modifications may be made on the specific display contents of the operation panel 14.

Figure 10:
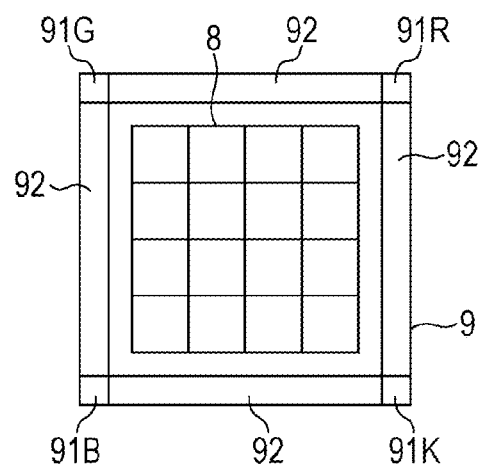
FIG. 10 is a schematic diagram illustrating a modification example of the display contents of an operation panel of a printer according to an embodiment of the invention.

FIG. 10 is a schematic diagram illustrating a modification example of the display contents of the operation panel 14. In this modification example, in step S204, the image pattern 8 is displayed on the operation panel 14 together with a color patch 9, surrounding the image pattern 8. Each of the outer and inner peripheries of the color patch 9 has a rectangular shape, and four corners 91R, 91G, 91B, and 91K of the color patch 9 are respectively colored in red, green, blue, and black. That is, when each of a red level, a green level, and a blue level that constitute each combination of RGB levels is represented by 256 numerical values from "0" to "255", the corner 91R, the upper-right corner, is colored in a color corresponding to a combination of RGB levels: (255, 0, 0); the corner 91G, the upper-left corner, is colored in a color corresponding to a combination of RGB levels: (0, 255, 0); the corner 91B, the lower-left corner, is colored in a color corresponding to a combination of RGB levels: (0, 0, 255); and the corner 91K, the lower-right corner, is colored in a color corresponding to a combination of RGB levels: (0, 0, 0). Further, a gradation pattern is formed in each of peripheral portions 92 that is interposed between corresponding two corners 91 among the four corners 91R, 91G, 91B, and 91K, and the color of an observation point on the gradation pattern, formed in each of the peripheral portion 92, continuously varies from the color of one of the two corners 91 to the color of the other one of the two corners 91 as the observation point moves from the one of the two corners 91 to the other one of the two corners 91.

Further, in this modification example, color calibration using the color patch 9 is performed. The control portion 752 and the camera 714 cooperate with each other to function as a colorimetric tool, and the color calibration using the color patch 9 is performed on this colorimetric tool. Specifically, the control portion 752 calibrates the association relations between reference colors and colors obtained through colorimetry using the camera 714, on the basis of the result of imaging of the color patch 9 by the camera 714. In this case, a specific method for execution of the color calibration may be the same as a conventional color calibration method.

In the modification example shown in FIG. 10, as described above, the operation panel 14 displays the color patch 9, for use in the calibration of the HMD 7, which performs colorimetry on the image pattern 8, on the operation panel 14 itself. This configuration, therefore, enables the HMD 7 to perform colorimetry on the image pattern 8 after execution of the calibration using the color patch 9, and thus improves the accuracy of the reading of the image pattern 8 by the HMD 7.

Figure 11:
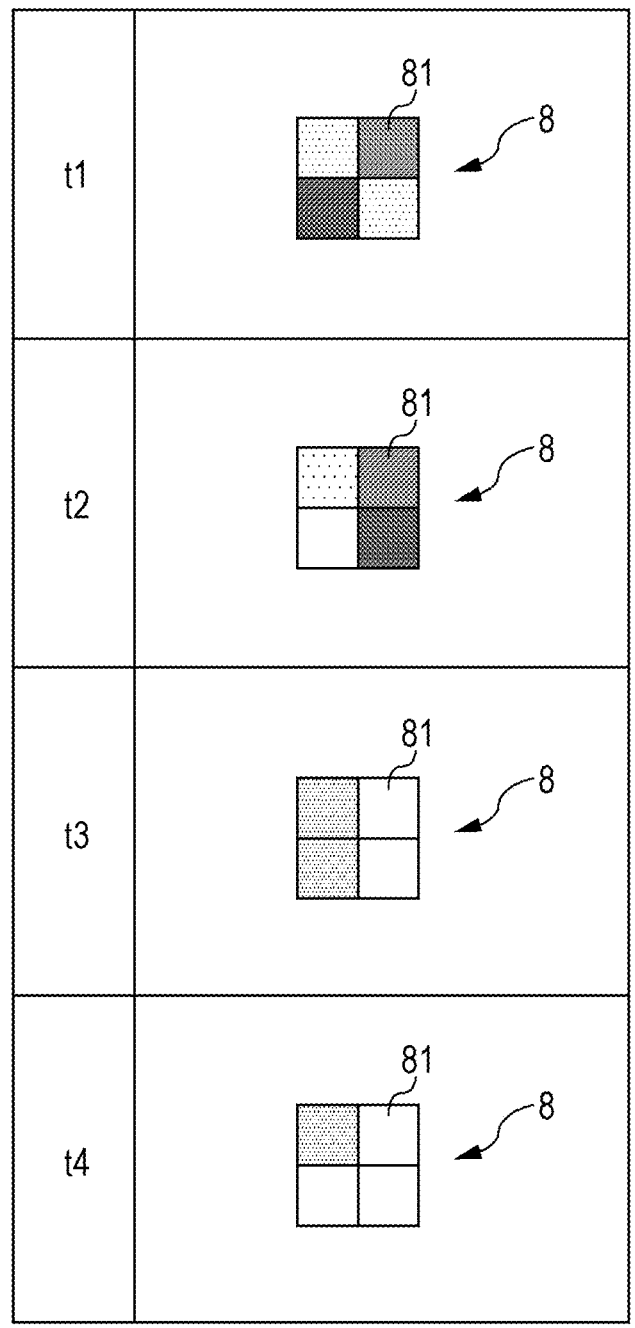
FIG. 11 is a schematic diagram illustrating another modification example of the display contents of an operation panel of a printer according to an embodiment of the invention.

FIG. 11 is a diagram illustrating another modification example of the display contents of the operation panel 14. In FIG. 11, signs t1, t2, t3, and t4 denote mutually different time points, and it is assumed that the time elapses in the order of time points t1, t2, t3, and t4. In this another modification example, in step S204, four segmented image patterns 8 are sequentially displayed one by one on the operation panel 14 in time series. Each of these four segmented image patterns 8 is associated with a corresponding one of four image patterns resulting from segmenting the single image pattern 8 shown in FIG. 8. Further, a first one of the four segmented image patterns 8 is composed of four cells 81 disposed in the upper-left portion of the image pattern 8 shown in FIG. 8, and is displayed at the time point t1; a second one of the four segmented image patterns 8 is composed of four cells 81 disposed in the upper-right portion of the image pattern 8 shown in FIG. 8, and is displayed at the time point t2; a third one of the four segmented image patterns 8 is composed of four cells 81 disposed in the lower-left portion of the image pattern 8 shown in FIG. 8, and is displayed at the time point t3; and a fourth one of the four segmented image patterns 8 is composed of four cells 81 disposed in the lower-right portion of the image pattern 8 shown in FIG. 8, and is displayed at the time point t4.

Meanwhile, in the HMD 7, the camera 714 images each of the four segmented image pattern 8 at a corresponding one of the time points t1, t2, t3, and t4 (step S201). Further, the control portion 752 combines the four segmented image patterns 8, having been acquired in the above manner, to reproduce the single image pattern 8 shown in FIG. 8 (step S202). Subsequently, in the same manner as described above, the control portion 752 decodes the single image pattern 8 (step S203), and then displays the piece of operational information (step S204).

In this manner, in the another modification example shown in FIG. 11, the control portion 50 of the printer 1 segments the image pattern 8, resulting from the encoding of the piece of operational information, into a plurality of segmented image patterns 8, and the operation panel 14 sequentially displays the plurality of segmented image patterns 8 in time series. As a result, this configuration reduces the area of a region required to display the image pattern 8.

By the way, the above encoding rule is a rule that prescribes the association relations between characters and combinations of RGB levels to allow a string of characters representing a piece of operational information to be converted into an image pattern colored in multiple colors. In this case, differences among the multiple colors are included in the image pattern to allow differences among pieces of information, that is, differences among the characters, to be discriminated, and when each of the differences among the multiple colors is very small, the reading of the image pattern 8 by the HMD may fail. Particularly when the resolution level of colors processed by the camera 714 of the HMD 7 is low, such a failure may frequently occur.

For this reason, in further another modification example described here, the control portion 50 of the printer 1 is provided with a plurality of encoding rules each associated with a corresponding one of mutually different resolution levels. Specifically, the control portion 50 is provided with five encoding rules each associated with a corresponding one of five kinds of numerical values (256 numerical values, 128 numerical levels, 64 numerical levels, 32 numerical levels, and 16 numerical values) for representing each of a red level, a green level, and a blue level that constitute each combination of RGB levels. In this configuration, the larger the total number of the numerical values, for representing each of a red level, a green level, and a blue level that constitute each combination of RGB levels, is (that is, the higher the resolution level of the colors R, G, and B is), the smaller each of color differences for discriminating pieces of information is. Reversely speaking, the smaller the total number of the numerical values, for representing each of a red level, a green level, and a blue level that constitute RGB levels, is (that is, the lower the resolution level of the colors R, G, and B is), the larger each of color differences for discriminating pieces of information is. Through the use of this configuration, the control portion 50 adjusts, in accordance with an input operation received by the operation panel 14, the degree of the color differences, which are included in the image pattern 8 to allow pieces of information to be discriminated.

This configuration, therefore, enables the service person to perform an input operation on the operation panel 14 (corresponding to an example of an input operation unit in the invention) so as to select one of the encoding rules that is associated with a resolution level lower than the resolution level of colors processed by the camera 714 of the HMD 7. Further, the control portion 50 of the printer 1 encodes a piece of operational information in accordance with the encoding rule, having been selected through the input operation on the operational panel 14, to generate an image pattern 8, and then displays this generated image pattern 8 on the operation panel 14.

Meanwhile, the control portion 752 of the HMD 7 is provided with five decoding rules each associated with a corresponding one of five kinds of numerical values (256 numerical values, 128 numerical values, 64 numerical values, 32 numerical values, and 16 numerical values) for representing each of a red level, a green level, and a blue level that constitute each combination of RGB levels. This configuration, therefore, enables the service person to perform an input operation on the touchpad 754 or the operation buttons 755 to select one of the decoding rules that is associated with the encoding rule, having been selected on the printer 1. Further, the control portion 752 of the HMD 7 decodes the image pattern 8 in accordance with the selected decoding rule to reproduce the piece of operational information, and causes the display portion 713 to display the piece of operational information, resulting from the reproduction. This configuration allows the service person to select an encoding rule and a decoding rule that are associated with an appropriate resolution level, and thus eliminates or minimize the failure in the reading of the image pattern 8.

Further, in the aforementioned embodiment, the HMD 7 is mealy configured to cause the display portion 713 to display the piece of operational information, obtained by decoding the image pattern 8. The HMD 7 may be configured to, however, transmit the piece of operational information to an external service center or the like via the communication portion 753.

Further, in the aforementioned embodiment, the image pattern 8 is composed of the plurality of cells 81. In this regard, however, in the another modification example, shown in FIG. 11, or any other modification, in which the plurality of segmented image patterns 8 are sequentially displayed in time series, each of the plurality of segmented image patterns 8 may be composed of a single cell 81 (one dimensional code) and be displayed on the operation panel 14.

Further, the shape of the image pattern 8 and the shape of each of the cells 81, constituting the image pattern 8, may be changed as needed. Moreover, the image pattern 8 is not limited to the color pattern described above, but may be a black-and-white pattern. In this case, the piece of operational information may be encoded into a conventionally used two-dimensional bar code (corresponding to the image pattern 8).

Further, in the aforementioned embodiment, the image pattern 8 is displayed on the operational panel 14. The image pattern 8, however, may be printed on the recording medium RM. In this case, the HMD 7 may merely read the image pattern 8 having been printed on the recording medium RM. Further, the printer 1 may be configured to, without encoding the piece of operational information, display the piece of operational information in a character string or any other similar means readable by a service person or the like, and then allow the HMD 7 to acquire the piece of operational information. In this regard, however, in the case where such an easily readable and understandable display method is undesirable from a security viewpoint, it is preferred to encode the piece of operational information.

Further, a terminal device usable in the decoding of the image pattern 8 is not limited to the HMD 7, but various portable terminal devices each incorporating a camera may be used as the terminal device. Examples of the portable terminal devices each incorporating a camera include, but are not limited to, a smartphone, a tablet PC, and a laptop PC.

The entire disclosure of Japanese Patent Application No. 2015-114533, filed Jun. 5, 2015 is expressly incorporated by reference herein.

What is claimed is:
1. A printer comprising:
a printing execution unit comprising a print head and configured to execute printing;
a code conversion unit configured to encode operational information in relation to the printing execution unit to generate an image pattern;
a display configured to display the image pattern, generated by the code conversion unit, on the display itself; and
an input operation unit configured to receive an input operation;
wherein the code conversion unit is further configured to encode the operational information into an image pattern representing a plurality of pieces of information by at least one color difference, and adjust, in accordance with the input operation received by the input operation unit, a degree of the at least one color difference included in the image pattern to allow the plurality of pieces of information to be discriminated.

2. The printer according to claim 1, wherein the display displays a color patch for use in calibration of a terminal device configured to perform colorimetry on the image pattern.

3. The printer according to claim 1, wherein the code conversion unit encodes the operational information into a plurality of segmented image patterns resulting from segmenting the image pattern, and the display sequentially displays the plurality of segmented image patterns in time series on the display itself.

4. A printing system comprising:
the printer according to claim 1; and
a terminal device including
a read unit that comprises a camera and is configured to read the image pattern, and
a decode unit configured to decode the image pattern, obtained through the reading by the read unit.

5. A terminal device comprising:
a read unit that comprises a camera and is configured to read an image pattern resulting from (i) encoding operational information in relation to a printer that performs printing into an image pattern representing a plurality of pieces of information by at least one color difference, and (ii) adjusting, in accordance with an input operation received by an input operation unit, a degree of the at least one color difference included in the image pattern to allow the plurality of pieces of information to be discriminated; and,
a decode unit configured to decode the image pattern, obtained through the reading by the read unit.

* * * * *